United States Patent
Xuan et al.

(10) Patent No.: US 10,153,938 B2
(45) Date of Patent: Dec. 11, 2018

(54) DETECTING DRIVING AND MODIFYING ACCESS TO A USER DEVICE

(71) Applicant: AirWatch, LLC, Atlanta, GA (US)

(72) Inventors: Chaoting Xuan, Atlanta, GA (US); Ravish Chawla, Marietta, GA (US); Jianling Wang, Atlanta, GA (US); Kar Fai Tse, Peachtree Corners, GA (US)

(73) Assignee: AirWatch, LLC, Atlanta, GA (US)

( * ) Notice: Subject to any disclaimer, the term of this patent is extended or adjusted under 35 U.S.C. 154(b) by 238 days.

(21) Appl. No.: 15/292,288

(22) Filed: Oct. 13, 2016

(65) Prior Publication Data
US 2018/0109412 A1    Apr. 19, 2018

(51) Int. Cl.
*G06F 15/16*    (2006.01)
*H04L 12/24*    (2006.01)
*G06F 3/0481*   (2013.01)

(52) U.S. Cl.
CPC ............ *H04L 41/046* (2013.01); *H04L 41/22* (2013.01); *G06F 3/0481* (2013.01)

(58) Field of Classification Search
CPC .... G06N 99/005; G06N 3/08; G06K 9/00335; H04L 41/046; H04L 41/22; G06F 3/0481
See application file for complete search history.

(56) References Cited

U.S. PATENT DOCUMENTS

| | | |
|---|---|---|
| 8,417,268 B1 | 4/2013 | Halferty |
| 9,026,780 B2 | 5/2015 | Ewell |
| 9,661,127 B1 | 5/2017 | Singh |
| 2005/0239479 A1 | 10/2005 | Bednasz |
| 2007/0072553 A1 | 3/2007 | Barbera |
| 2011/0009107 A1 | 1/2011 | Guba |
| 2013/0217331 A1 | 8/2013 | Manente |
| 2014/0111646 A1 | 4/2014 | Hamilton |
| 2015/0062017 A1 | 3/2015 | Barabas |
| 2015/0099500 A1 | 4/2015 | Chalmers |
| 2016/0094707 A1 | 3/2016 | Stuntebeck |
| 2017/0094455 A1 | 3/2017 | Beaurepaire |
| 2017/0099582 A1 | 4/2017 | Boesen |
| 2018/0012090 A1* | 1/2018 | Herbst ............... G06K 9/00845 |
| 2018/0074493 A1* | 3/2018 | Prokhorov ........... G05D 1/0088 |

\* cited by examiner

*Primary Examiner* — Jonathan A Bui
(74) *Attorney, Agent, or Firm* — Clayton, McKay & Bailey, PC

(57) ABSTRACT

Systems and methods are included for detecting driving based on user-specific models for driving detection, and restricting access to an application of the user device while a user is driving. A management agent installed on the user device can collect data from sensors in a user device and provide the data to a management server, which can build a user-specific model for driving detection for that user. The management agent can then use that user-specific model for detecting when the user is driving. When the agent determines that the user is driving, it can enforce a driving policy that limits access to applications and delay or modify notifications generated by applications.

20 Claims, 7 Drawing Sheets

DETECTING DRIVING AND MODIFYING ACCESS TO A USER DEVICE

BACKGROUND

As people increasingly rely on user devices, such as smartphones, in their daily lives, the temptation to access a user device while driving continues to cause accidents, injuries, and even deaths. Almost every state in the United States has passed laws prohibiting or limiting phone use while driving. However, these laws have not been able to overcome the convenience of multitasking while driving. As a result, many automotive accidents are still caused by drivers distracted by their smartphone.

Some software applications attempt to enforce rudimentary safeguards to prevent driver interaction with a user device while driving. For example, some applications use Global Positioning System (GPS) information to determine that a user is traveling in a vehicle. If the user attempts to type within the application while the vehicle is moving, the application can block the user from typing unless they indicate that they are a passenger, rather than a driver. But a driver can easily circumvent this safeguard by simply indicating that they are a passenger, regardless of whether they are driving or not.

Current systems do not provide a way to monitor and control device usage with respect to driving. Instead, each application is left to individually detect driving and self-regulate its own functionality. Some applications do not attempt to detect driving at all, and others have limited detection functionality. Because individual applications are responsible for detecting driving and implementing safeguards, it is very difficult for an administrator to govern device usage across multiple applications with respect to driving.

Further, the issue of determining whether a user is a driver or a passenger has not been solved in a viable manner. Current systems either need data that is unavailable to a user device (such as vehicle sensor data), or rely on a user self-regulating his or herself in a manner already proven to be ineffective.

As a result, a need exists for reliable detection of driving based on information gathered by or from a user device, including determining whether a user is a driver or passenger in a vehicle. Additionally, a need exists for appropriately limiting access to a user device in response to detecting that the user is driving.

SUMMARY

Examples described herein include systems and methods for detecting driving based on user-specific models for driving detection, as well as systems and methods for restricting access to an application or user device while a user is driving.

In one example, a method is provided for detecting driving based on user-specific models for driving detection. A stage of the method can include sending a management agent to a first user device from a management server for installation. The management agent can be configured to collect first data from various sensors on the user device, such as a GPS sensor, accelerometer, gyroscope, and others. Another stage of the method can include training a first model at the management server based on receiving the first data from the management agent. Training can include modifying the first model based on whether the model correctly predicts that the first user is driving. The prediction can be verified by the user or by other verification techniques. The first model can be stored at the management server in a manner that associates the first model with the first user. In some examples, the first model can be different than a second model trained for a second user, as different users may have different habits associated with their user device while they are driving.

Another stage of the method can include sending the first model from the management server to the management agent that is installed on the first user device. When the first user is logged into the first user device, the management agent on that user device can execute the first model. For example, the management agent can detect that the first user is driving by using the first model to analyze data collected from at least the GPS sensor, accelerometer, and gyroscope on the first user device. In another example, the management agent can utilize the first model to analyze data collected from at least one of the following user-device components: a gravity sensor, a magnetometer, an ambient light sensor, a microphone, a camera, a heart-rate sensor, a pulse oximeter, or a pedometer. The user device components can be part of one or more user devices, such as a phone and a wearable user device.

In an example, the management agent can process a feature, such as a turn, a lane change, braking, accelerating, reversing, cruising, or parking. The detection can be made by applying the first model to the data collected from the user device components. The management agent can utilize a processed feature as an input to the first model. By substituting processed features for raw data, the management agent can conserve processing power.

The management agent can also utilize usage data, also described herein as user-interaction data, to determine whether a user is driving. For example, the management agent can utilize information associated with at least one of: coordinates of the user's touch locations on the user device, the user's touch pressure on the user device, duration of the user's touches, gestures, time spent on an open application, user interaction with a soft keyboard of the user device, or the calibrated orientation of the user device. The first model can take the usage data into account to determine whether the user is driving. For example, slower one-handed typing can tend to indicate the user is driving compared to faster two-handed typing.

An example method can also include determining whether the first model correctly predicts that the first user is driving. For example, the method can include gathering data associated with the user's interaction with a graphical user interface ("GUI") of the first device. In an example, this can include prompting the first user with one or more GUI elements that require user input, such as responding to a question about whether the user is driving, typing in a number code, or typing a response to a question.

An example method is also provided for restricting access to an application of a user device while a user is driving. The method can include enrolling a user device with a management server, establishing a driving policy to be carried out by a management agent installed on the user device, and sending a management agent from the management server to the user device.

The management agent can carry out a variety of stages once installed on the user device. For example, the management agent can detect, based on information collected from the user device, that the user is driving a vehicle. The detection can be governed by a model associated with the user and downloaded from the management server. In response to detecting that the user is driving a vehicle, the management agent can enforce the driving policy for the user device.

Enforcing the driving policy can include limiting access to at least one application installed on the user device, including a managed application. For example, the management agent can prevent an application from executing on the user device. In an example, the management agent can lock the user device entirely. In another example, the management agent can temporarily replace, alter, or limit keyboard functionality of the device. This can include graying out at least a portion of the keyboard, blocking the keyboard with an overlay, or preventing the keyboard from executing on the user device in association with one or more applications.

Enforcing the driving policy can also include delaying or modifying notifications generated by one or more applications installed on the user device. For example, the management agent can downgrade a priority level of notifications from particular applications while the driving policy is being enforced. The management agent can also cause the user device to automatically respond to an incoming communication, such as an email, SMS, MMS, or message, with a response indicating that the user is currently driving. The response can include an estimated time during which the user will be driving.

In one example, a system is provided for restricting access to an application of a user device while a user is driving. The system can include a non-transitory, computer-readable medium that contains instructions, and a management server having a processor that executes the instructions to perform various stages, such as sending a management agent from the management server to the user device.

The management agent can carry out a variety of stages as well. For example, it can detect, based on information collected from the user device, that the user is driving a vehicle. In response to detecting that the user is driving a vehicle, the management agent can enforce the driving policy for the user device. Enforcing the driving policy can include limiting functionality of at least one application installed on the user device. It can also include delaying or modifying notifications generated by applications installed on the user device.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are provided for detecting driving based on user-specific models for driving detection, and restricting access to an application of the user device while a user is driving. A management agent installed on the user device can collect data from sensors in a user device, such as a GPS sensor, an accelerometer, and a gyroscope, among others, and provide the data to a management server. The management server can build a user-specific model for driving detection for that particular user. The management server can then provide the user-specific model to the management agent installed on the user device, which can in turn use that model to detect when the user is driving.

When the management agent determines that the user is driving, it can enforce a driving policy that temporarily limits access to applications or to the user device in a variety of ways. For example, the management agent can limit access to an application by preventing the application from executing on the device, blocking certain features within the application, or by locking the user device entirely. The management agent can also delay or modify notifications generated by applications on the user device. For example, the management agent can downgrade the priority level of a notification or delay the notification from issuing at all during the enforcement of the driving policy. Other applications, such as a navigation application, can be left to generate notifications as normal during enforcement of the driving policy. In some examples, enforcing the driving policy can also include automatically responding to income messages, such as an email, SMS, MMS, instant message, or any other message, with a communication indicating that the user is currently driving.

Figure 1:
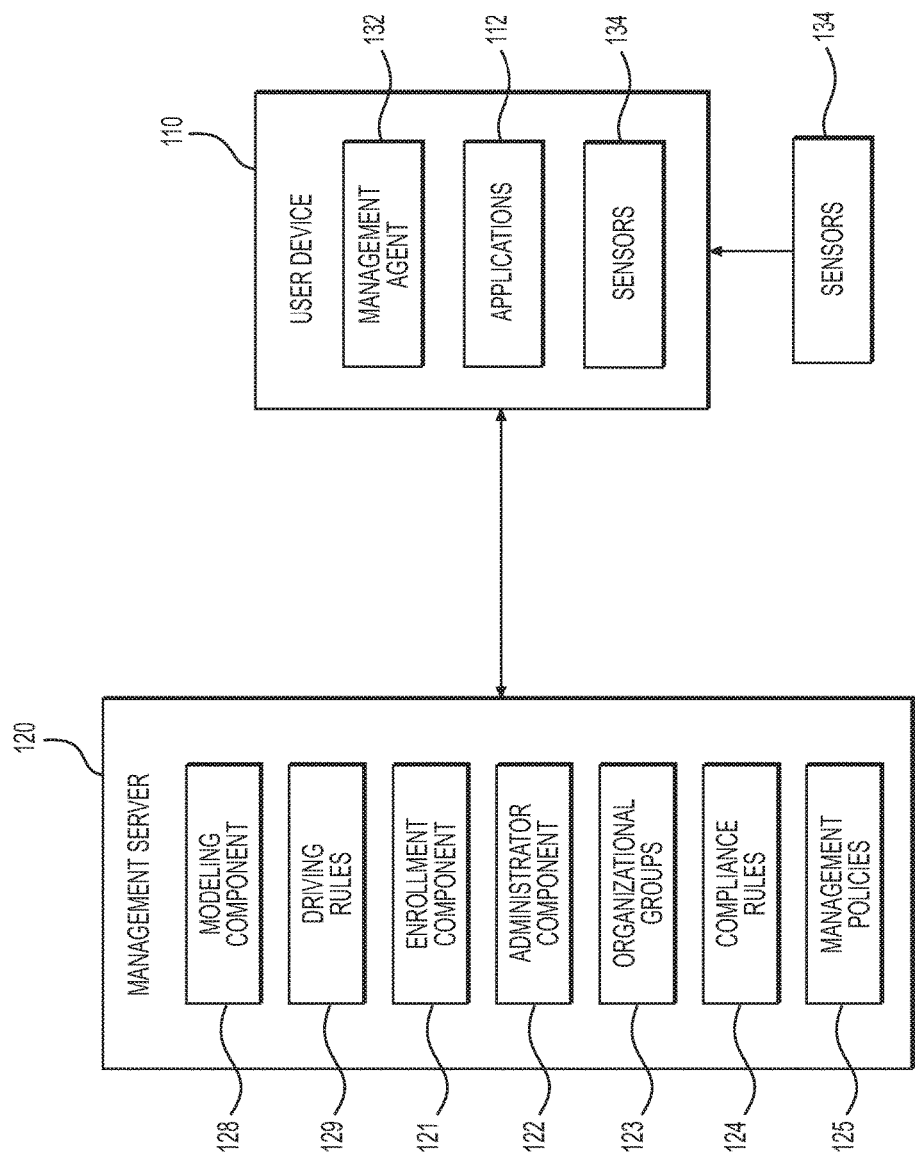
FIG. 1 is an exemplary illustration of system components for detecting driving and modifying feature access on a user device.

Turning to FIG. 1, an illustration of system components of an example system is shown detecting driving and modifying access to a user device 110. A user device 110 can include any computing device, such as a cell phone, laptop, tablet, personal computer, workstation, hand-held scanner, card reader, or register. The user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. Furthermore, the terms "user device," "device," "user devices," and "devices" are used interchangeably, as appropriate.

The user device 110 can enroll with a management server 120—for example, as part of an overall EMM or Mobile Device Management ("MDM") system. The EMM system can include multiple servers, processors, and computing devices. In some examples, the management server 120 is a network of servers, some of which can be located remotely from one another. In another example, the management server 120 is a single server with multiple purposes. In yet another example, the management server 120 can be one or more servers dedicated to the operations described herein.

The management server 120 can monitor and manage the operation of user devices 110, through the management server 120 itself, or more specifically, through a management service or program executing on the management server 120. Although one user device 110 is shown, the management server 120 can monitor and manage the operation of multiple user devices 110 enrolled in an EMM system. The management server 120 can also provide access to email, calendar data, contact information, and other enterprise resources to enrolled user devices 110. A system administrator can have privileges associated with managing, editing, revising, and otherwise administrating functions associated with the management server 120.

The management server 120 can include components for enrolling the user device 110 and confirming compliance. These features will be discussed in more detail below. As part of the enrollment process, the management server 120 can cause a management agent 132 to be installed on the user device 110. The management agent 132 can be a portion of an operating system for the user device 110, or it can operate in the application layer of the user device 110. For example, the management agent 132 can be a dedicated application or other software installed on the user device 110 that can monitor and manage data, software components, and hardware components associated with the user device 110. The management agent 132 can monitor and control functionality and other managed applications on the user device 110.

The management agent 132 can be an application, or portion of an application, that provides functionality beyond simply monitoring and managing resources in the user device 110. In one example, a developer can use a software development kit ("SDK") to insert, for example, security libraries into the application that can communicate with the management agent 132. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent 132 executing in a user device 110. For example, if a security library provides the ability to monitor and enable or disable functionality provided by an application, the management agent 132 can call functions provided by the library to monitor and enable or disable the functionality.

The user device 110 can also include one or more applications 112, distinct from the management agent 132, that execute on the user device. The applications 112 can include managed applications provided and managed by the management server 120, other internal applications downloaded from a source other than the management server 120, and web-based applications that provide an application-based gateway to a website.

Further, the user device 110 can include a variety of sensors 134 that collect various types of data. For example, the user device 110 can include one or more of a GPS sensor, accelerometer, proximity sensor, gravity sensor, gyroscope, magnetometer, ambient light sensor, microphone, camera, wireless internet ("WIFI") connector, BLUETOOTH connector, moisture sensor, press-sensitive screen, and any other components that generate data based on a current state of the user device 110 or its surroundings. Each of these sensors 134 can generate data associated with the sensor 134. For example, the GPS sensor can generate data indicating a geographic location of the user device 110 at a particular time. And while some of the sensors 134 listed—such as the camera and microphone—are not considered "sensors" in the traditional sense, they are nonetheless referred to as sensors 134 throughout this disclosure, as they can be used to generate data based on the current state of the user device 110. In other words, the term "sensor" is intended to encompass any component associated with a user device 110 that can generate data based on a state of the user device 110 or its surroundings. Furthermore, the term "sensor" includes external devices that can generate data based on a state of the user or the user's surroundings and provide that data to the user device 110. Examples include, but are not limited to, a heartrate sensor, pulse oximeter, or pedometer.

The various sensors 134 associated a user device 110 can generate sensor data associated with one or more of the sensors 134. In some cases, sensor data can include data generated by processing information obtained from multiple sensors 134. For example, location data can include a combination of data from a GPS sensor as well as a WIFI module that can detect the location of WIFI nodes. Similarly, orientation data can include a combination of data from an accelerometer and gyroscope.

In addition to sensor data, a user device 110 can generate or collect usage data. Usage data can include any type of data generated based on a user's interaction with the user device 110. For example, usage data can include data associated with the coordinates of touch locations on a screen of the user device 110, the pressure of the user's touches on the screen of the user device 110, the duration of touches, and the timing associated with the user's touches. Usage data can also include data associated with gestures, such as tapping, scrolling, slinging, forced pressing, and zooming. Usage data can also include data associating any kind of touch data with what is shown on the GUI at that time. For example, usage data can include the time it takes for a user to respond to a question or prompt displayed on the GUI. Usage data can also include a calibrated orientation of the user device 110. A calibrated orientation is the three-dimensional orientation of the user device 110 relative to the earth, and can be calculated based on information provided by sensors 134 such as the accelerometer and gyroscope, among others.

The management agent 132 can gather information from any sensors 134 associated with the user device 110 and transmit that information to the management server 120 for use in creating a model. For example, the management agent 132 can transmit batches of raw data captured during a period of time. In one example, the management agent 132 transmits a batch of raw data collected from the sensors 134 during a period of time corresponding to using a particular application 112, such as a navigation application. In another example, the management agent 132 transmits batches of raw data collected from the sensors 134 at predetermined intervals, such as once every five minutes. In yet another example, the management agent 132 can send samples of raw data associated with different use cases for the user device 110, including when the user is typing an email, using a navigation application, using a social media application, and so on.

In one example, the management agent 132 also predicts whether the user is driving based on a pre-existing model. The user can be prompted to verify whether they were driving. The prompt to verify can come after the management agent 132 detects that the user has stopped, in one example. The prompt can also ask the user if they began driving at a certain time. The management agent 132 can track the user's response and send the verification data to the management server 120 for use in building the model.

The management server 120 receives the data collected from the sensors 134 and utilizes a modeling component 128 to generate a model for detecting driving. The modeling component 128 can be a module within the management server 120 or a separate server, or collection of servers, that communicates with the management server 120. In one example, the modeling component 128 can include a component on the management server 120 and one or more additional components located on other servers. This can be advantageous if, for example, the modeling component 128 occasionally requires heavy processing power that would otherwise overwhelm or slow down the management server 120.

The modeling component 128 can use a machine-learning technique to train a model for detecting driving and to improve the model over time. While various algorithms can be used for machine learning, an example lightweight, nonlinear algorithm is provided below for performing a binary classification algorithm, also referred to as an online logistic regression.

The algorithm includes a hypothesis function, as shown in Equation 1.

$$h_\theta = g(\theta^T x) \qquad (1)$$

In Equation 1, h represents the hypothesis function, θ represents a weight, T represents time, x represents a data entry, and g represents a sigmoid function given by Equation 2. The weight can be a predetermined value that adjusts the hypothesis function as the model is trained. The weight can therefore be altered across multiple iterations of training. A data entry can include any type of data gathered by the management agent 132, such as sensor data or user-interaction data.

$$g(z) = 1\frac{1}{1+e^{-z}} \qquad (2)$$

In Equation 2, z represents the product of θ' and x, where θ' is the transpose of θ.

The next equation assumes n data fields, where each data field is a field of a notification object, for example, and m training samples. The cost function J is given by Equation 3.

$$J(\theta) = \frac{1}{m}\sum_{i=1}^{m}[y^{(i)}\log(h_\theta(x^{(i)}))\ (1\ y^{(i)})\log(1\ h_\theta(x^{(i)}))] \qquad (3)$$

The variables described above with respect to Equations 1 and 2 apply to Equations 3 and 4 as well. In Equation 3, y represents a prediction value. In one example, the prediction value is a value that indicates whether the user is driving or not. In some examples, the prediction value can be a 0 or 1, representing not driving and driving, respectively. In other examples, the prediction value can range from 0-100, with values above a certain threshold value (such as 80, for example) indicating that the user is driving.

Finally, for each new sample (x', y'):

$$\theta_j = \theta_j\ (h_\theta(x')\ y')x_j \qquad (4)$$

The equations listed above are merely exemplary, and other machine learning algorithms could be used instead of, or in addition to, these equations.

Using data-analysis techniques, such as the machine-learning algorithms described above, the modeling component 128 can generate a model based on the data provided from a user device 110. Because the data from the user device 110 can include information regarding the particular user logged in to the device 110, the modeling component 128 can generate a model that is specific to a particular user. In a scenario where a user device 110 is shared by multiple users, the management agent 132 on the user device 110 can receive multiple models from the modeling component 128, and apply the relevant model based on the user that is currently logged in to the user device 110.

The modeling component 128 can generate models that require raw data information from the user device 110, including sensor 134 data as well as usage data (the "first layer" of data), as inputs, or that require processed features (the "second layer" of data) as inputs. In the example where a model requires processed features as inputs, the modeling component 128 can provide the management agent 132 with separate models to process features. Processed features can include any type of feature or event useful for determining whether a user is driving. For example, a processed feature can include a turn, a lane change, braking, accelerating, reversing, cruising, or parking. A processed feature can also include picking up the user device 110, typing, gesturing, or locking the device 110. The modeling component 128 can specify individual models for the management agent 132 to use for recognizing processed features based on the raw data collected from the sensors 134. From there, the management agent 132 can plug the processed features into a model for determining whether the user is driving. In another example, the management server 120 can parse the first layer of data to determine processed features, and/or use those processed features as inputs to the driving-detection model.

Models generated by the modeling component 128 can be modified over time to increase accuracy and adapt to changes in user behavior. After training a model and sending it to the management agent 132, the modeling component 128 can continue to receive data collected by the user device 110. That data can include a confirmation that the user is driving, which can be used to confirm or modify the model. For example, the user device 110 can prompt the user with a question or requested action that provides an indication of whether the user is driving. This is discussed in more detail in association with FIG. 3.

By obtaining confirmation of whether the user is driving or not, the management agent 132 can provide valuable information to the management server 120 leading to a more accurate model. This is especially true for situations where the user is accessing a user device 110 in a vehicle, but is not driving the vehicle. For example, the user might be the passenger in a car or bus, in which case no restrictions on the user device 110 would be desirable. Through machine-learning techniques, the modeling component 128 can eventually create a model that reliably distinguishes between merely traveling in a vehicle and driving the vehicle. By way of example, a user may type slower while driving, hold the user device 110 in a particular orientation more often, or lose accuracy with their screen touches. These factors can be considered and accounted for by the modeling component 128.

The management server 120 can also include a driving rules component 129. Driving rules 129, also referred to as "driving policies," can encompass any enforcement mechanisms or other instructions provided for a management agent 132 to carry out in the event that driving is detected. For example, the management server 120 can include a driving rule 129 that restricts access to one or more applications 112 on the user device 110. More specifically, the driving rule 129 can prevent an application 112, such as a text messaging application, from executing on the user device 110 while the user is driving, as an example. In one example, a driving rule 129 can instruct the management agent 132 to lock the user device 110 while the user is driving. In another example, a driving rule 129 instructs the management agent 132 to only allow whitelisted applications 112 to execute on the device 110—for example, only allowing navigation or other driving-related applications 112.

In another example, a driving rule 129 can instruct the management agent 132 to restrict access to the keyboard that appears on the GUI of the user device 110 (the "soft keyboard"). For example, during driving, the management agent 132 can cause the soft keyboard of the user device 110 to be "grayed out," blocked by a warning or restriction message, or otherwise incapacitated. In one example, the management agent 132 allows the keyboard to retain microphone-based functions, such as a talk-to-text feature. In that example, the keyboard may be grayed out except for a microphone button that launches a talk-to-text function.

In yet another example, enforcing the driving rule 129 includes modifying at least one notification generated by an application 112 installed on the user device 110. Applications 112 installed on a user device 110 can generate notifications based on various actions or activities. For example, an email application 112 can generate a notification when an email is received. A calendar application 112 can generate a notification when a meeting invitation is received or when an appointment reminder is generated. A social-media application 112 can generate a notification when the user is tagged in a post. A messaging application 112 can generate a notification when a message is received. A gaming application 112 can generate a notification based on actions taking place in the user's ongoing game. The examples above are merely exemplary and not intended to be limiting in any way. Applications 112 can generate notifications for almost any type of activity related to the application 112.

The operating system of a user device 110 can include a notification manager (sometimes referred to as a "notification center") that handles notifications from various applications. Many operating systems, such as GOOGLE's ANDRIOD or APPLE's iOS, include a built-in notification manager. The notification manager can display notifications in various manners and locations. For example, notifications can be displayed on the lock screen, the home screen, a taskbar, a pull-down menu, or on application 112 icons, among other locations.

The notification manager relies on priority levels for notifications in order to determine how, where, and in what order to display notifications. Notification priority levels are set by the applications 112 themselves. For example, an email application 112 can choose to assign a higher priority level to a notification of an email received from a coworker relative to a notification of an email from an unknown sender. Depending on the particular operating system, the application 112 can choose from a number of predefined priority levels. For example, an operating system can define priority levels 1-5, with 1 being the least important and 5 being the most important. The notification manager can take actions based on the notification priority levels, such as displaying multiple notifications in a particular order or hiding unimportant notifications.

A notification can include a notification object containing data regarding the notification. For example, the notification object can include an application field that identifies the application 112 that generated the notification object, an action field that provides instructions regarding an action to take if the user opens the notification, a text field that includes the text included in the notification display, a time field that includes the time at which the notification issued, a data field that includes data regarding the notification, and a priority field which includes a priority level set by the application 112. The notification object can include additional or different data fields beyond the example fields described above.

The management agent 132 can detect the generation of a notification object associated with a notification. In one example, the management agent 132 receives the notification object or some portion of the notification data from the operating system or the application 112 that generates the notification. In one example, the management agent 132 gathers notification data, such as a notification object, by accessing a native application program interface ("API") on the user device 110. For example, an ANDRIOD operating system running on a user device 110 can include a native API that includes various hooks or access points, through which the management agent 132 can gather data. The management agent 132 can make requests to the operating system regarding receiving, retrieving, or otherwise accessing notification objects.

A driving rule 129 can instruct the management agent 132 to access a notification object associated with a notification and modify the notification object before it is passed to the notification center of the operating system. In the example of a text messaging application 112, a notification object can be generated upon receipt of a new text message. If the user is currently driving, a driving rule 129 can specify that the management agent 132 access and modify the notification object. For example, the management agent 132 can modify the priority level of the notification set by the application 112, by downgrading the priority level if the application 112 is not conducive to driving, or upgrading the priority level of a driving-related application 112 such as a navigation application 112. In some examples, the management agent 132 can prevent or delay the notification object from being passed to the notification center while the user is driving.

In addition to restricting access to applications 112 and modifying or delaying notifications, driving rules 129 can also instruct the management agent 132 to cause an application to automatically respond to an incoming communication. In the case of a text-messaging application 112, for example, a driving rule 129 can specify that if a text message is received while driving, the text-messaging application 112 automatically responds with a message indicating that the user is driving. This is discussed in more detail in association with FIG. 6.

In addition to the modeling component 128 and driving rules component 129, the management server 120 includes various components related to EMM system management. These components can include, for example, an enrollment component 121 that enrolls user devices 110 with the management server 120, an administrator component 122 that provides administrative access to enterprise management, organizational groups 123 that define particular groups for user devices 110, compliance rules 124 that define rules and corresponding remedial actions for user devices 110, and management policies 125 that provide permissions or enable particular functionalities for user devices 110. The driving rules component 129 can be part of the management policies 125 in one example. Each of these components is discussed in more detail below.

With respect to enrollment, the management server 120 can include an enrollment component 121 and an administrator component 122, either or both of which can be used for the process of enrolling a user device 110. For example, the user device 110 can communicate with the enrollment component 121 during the initial stages of enrollment. In some examples, the enrollment component 121 can provide a token to the user device 110 indicating that the user device 110 has been authenticated and is permitted to communicate and enroll with the management server 120. The management server 120 or enrollment component 121 can provide the user device 110 with information regarding how to access and communicate with the administrator component 122 in order to continue the enrollment process.

In some examples, the administrator component 122 can request a token from the user device 110, indicating that the user device 110 has been authenticated and is permitted to continue the enrollment process with the administrator component 122. Upon receiving the token, the administrator component 122 can continue the enrollment process. The administrator component 122 can also provide a console for an administrator to configure and monitor the status of the user device 110 and the enrollment process. In some examples, the administrator component 122 can be dedicated to a particular enterprise or group of enterprises, while the enrollment component 121 can be shared across multiple different enterprises.

In addition to the enrollment component 121 and administrator component described above, the management server 120 can include one or more organizational groups 123. Organizational groups 123 can be used by the management server 120 to apply driving rules 129, compliance rules 124, or management policies 125 to particular groups of user devices 110. An organizational group 123 can include data representing a group of user devices 110 managed by the management server 120. An organizational group 123 can correspond to a structure or hierarchy of a business or enterprise. For example, an enterprise can have various groups such as an engineering team, an accounting team, and a marketing team. Each of these teams can correspond to an organizational group 123 stored on the management server 120.

The management server 120 can also include compliance rules 124. A compliance rule 124 can set forth one or more conditions that must be satisfied in order for a user device 110 to be deemed compliant. If compliance is broken, the management server 120 can take steps to control access of the user device 110 to enterprise files, applications, and email. Compliance rules 124 can be assigned differently to the different organizational groups 123. For example, a developer group can be assigned different compliance rules 124 than an executive group. The executive group might be allowed to install different applications than the development group. Similarly, the management server 120 can assign different compliance rules 124 based on the different location-based organizational groups 123.

The determination of whether a user device 110 is compliant can be made by the management server 120, the user device 110, or a combination of both. For example, the management agent 132 on the user device 110 can generate a data object that describes the state of the user device 110, including any settings, parameters, applications, or other information regarding the state of the user device 110. The data object can be analyzed by the management server 120 or the user device 110 to determine whether the user device 110 is in compliance with compliance rules 124. In the case of the user device 110 analyzing compliance, a management agent 132 installed on the user device 110 can make the comparison between the data object and compliance rules 124.

In some examples, a compliance rule 124 can specify one or more conditions. If a condition occurs, the system can react accordingly. For example, the management server 120 can automatically perform one or more remedial actions. In another example, the management server 120 can prompt an administrator to take one or more remedial actions. In some cases, remedial actions can be staged, such that the user of a user device 110 is provided with a chance to remedy their noncompliance before being subjected to stricter remedial actions.

A management policy 125 can specify that a user device 110 has permission to perform or access certain functionality. For example, the user device 110 can be restricted to certain enterprise repositories and functions within applications. In one example, the management policy 125 applies to an organizational group 123, with which the user device 110 can be associated. The organizational group 123 can change over time and include different user devices 110 over time. But because the management policy 125 is associated with the organizational group 123 rather than the any particular user device 110, the management policy 125 can apply to all user devices 110 within the organizational group 123 at any given time.

In one example, the user device 110 can become a member of, or become associated with, an organizational group 123 when an administrator specifies that the user device 110 should be a member. In another example, the user device 110 becomes associated with an organizational group 123 when a membership condition is satisfied, such as through a dynamic evaluation of the membership condition. A membership condition can be created by an administrator 110 by specifying a condition relating to the user device 110 that, when satisfied, causes the user device 110 to be associated with the organizational group 123. Similarly, the membership condition can be created such that when a condition relating to the user device 110 is met (or not met), the user device 110 is removed from the organizational group 123.

Alternatively, a user device 110 can become disassociated with an organizational group 123 based on the user of the user device 110. For example, an administrator 110 or dynamic evaluation can identify an individual for additional to, or removal from, an organizational group 123. If the user operates multiple user devices 110, all of the user's devices 110 can be added to, or removed from, the organizational group 123 of interest. In this way, all of the user's devices 110 can be made subject to a uniform set of management policies 125 and compliance rules 124.

As part of the enrollment or management of a user device 110, an administrator 110 can create a device record for the user device 110. The device record can be stored on the management server 120, and can include data related to the management of the user device 110. For example, the device record can include data describing one or more of: the identity and type of the user device 110; components of the user device 110; the state of the user device 110; organizational groups 123 to which the user device 110 belongs; compliance rules 124 with which the user device 110 must comply; and management policies 125 that specify if, when, and how the user device 110 is permitted to function.

For example, data describing the identity and type of the user device 110, as well as the components of the user device 110, can include at least one or more of: a unique identifier associated with the user device 110; a device type of the user device 110 (e.g., a smartphone, a tablet computing, a laptop computer, a desktop computer, a server computer, or a virtualized instance of any of such computer types); and various software and hardware components of the user device 110 (e.g., operating system (or kernel or bios) type and version, processor type and speed, memory type and size, network interface types, various I/O component types such as camera, touchscreen, keyboard, mouse, printer).

The device record can also include data describing the state of the user device 110 such as various settings that are applied to the user device 110. The data can also specify various applications that are installed on or being executed by the user device 110, and various files that are installed on or are accessible to the user device 110. Additionally, the data describing the state of the user device 110 can specify information related to the management of the user device 110, such as the last time the user device 110 provided data describing its state to the management server 120. The data can also describe whether the user device 110 is in a state of compliance with any applicable compliance rules 124, and whether any remedial actions have been (or are to be) taken as a result of a noncompliance with any applicable compliance rules 124.

The data describing organizational groups 123 to which the user device 110 belongs can, for example, include any organizational groups 123 of which the user device 110 is a member. The data can include a hard-coded relationship between the user device 110 and the organizational group 123, in one example. Alternatively, the relationship can be established by a dynamic evaluation of a membership condition associated with the organizational group 123.

The data describing compliance rules 124 with which the user device 110 must comply can, for instance, specify one or more remedial actions that should be performed in the event that an associated rule condition occurs. Data describing management policies 125 can include permissions of the user device 110, such as access rights, and settings that are being enforced upon the user device 110. In some examples, the data describing compliance rules 124 and the data describing management policies 125 can be obtained from an organizational record associated with an organizational group 123 to which the user device 110 is a member.

In some examples, an administrator 110 can manually input data into the administrator component 122 in order to generate a device record for a user device 110. In other examples, the administrator component 122 can obtain a data object, such as an electronic spreadsheet, extensible markup language ("XML") file, or comma separated values ("CSV") file. The administrator component 122 can extract information describing the user device 110 from the data object to create a corresponding device record. The device record for each user device 110 can include information identifying each user device 110 and its respective device record.

In some examples, after the administrator component 122 creates a device record for a user device 110, the management server 120 can detect whether the user device 110 is enrolled. For example, the management server 120 can determine whether a flag is set, indicating that the user device 110 is enrolled.

If the user device 110 is not yet enrolled, the management server 120 can automatically transmit information identifying the user device 110 to the enrollment component 121. For example, the user device 110 can transmit a device identifier, such as its media access control ("MAC") address, to the enrollment component 121. In some examples, when the enrollment component 121 receives the device identifier, the enrollment component 121 can determine whether a corresponding device record exists. If there is no corresponding device record, the enrollment component 121 can determine that the user device 110 is not authorized to enroll.

Figure 2:
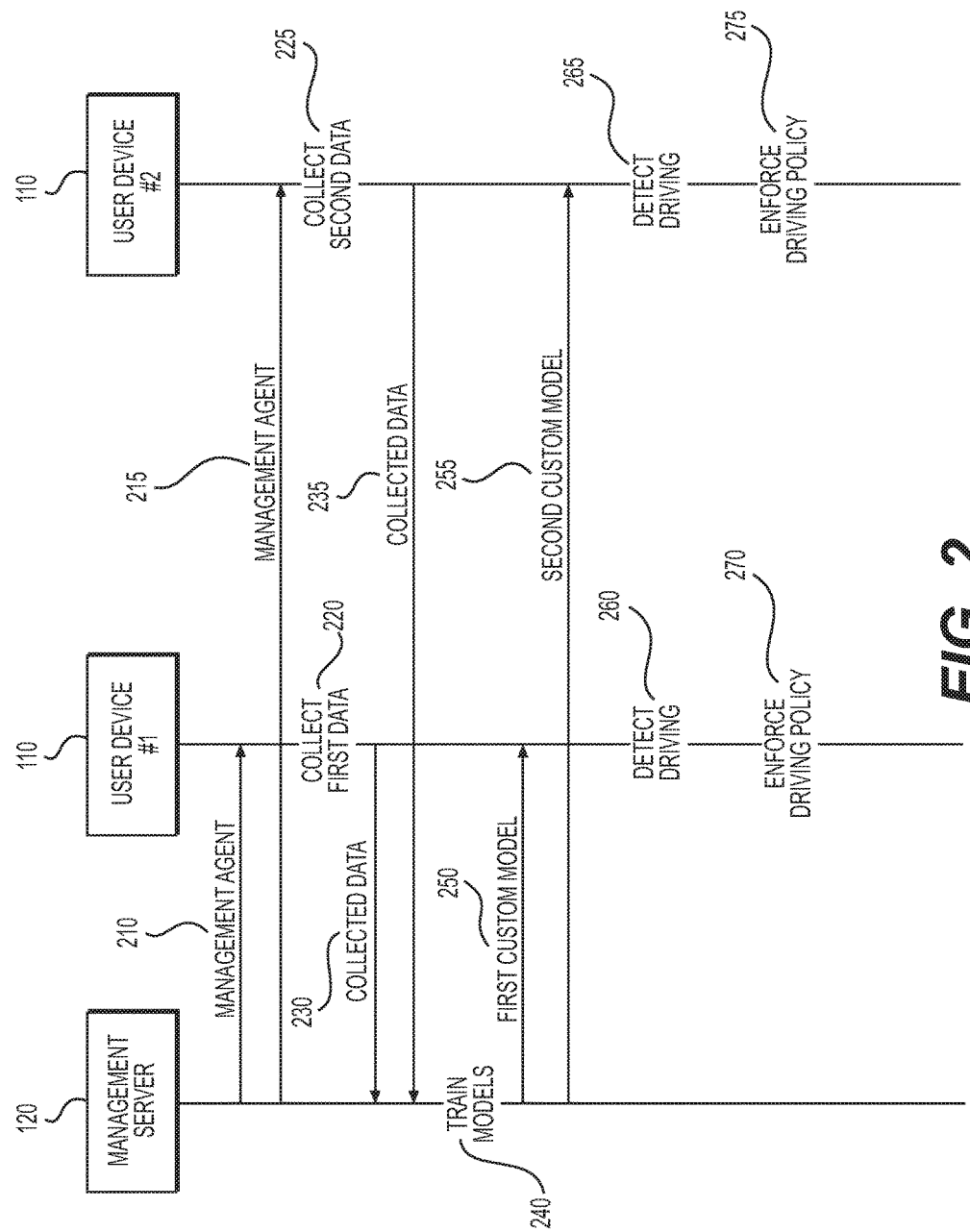
FIG. 2 is a flowchart of an exemplary method for providing and enforcing custom models for detecting driving and modifying access to a user device.

FIG. 2 provides a flowchart illustrating an exemplary method for providing and enforcing custom models for detecting driving and modifying access to a user device. The flowchart in FIG. 2 includes a management server 120, first user device 110, and second user device 110. However, any number of user devices can be included in the method.

At stages 210 and 215, the management server 120 sends a management agent 132 to both the first and second user devices 110, respectively. User devices 110 can be corporate-owned or employee-owned devices that are part of a "bring your own device to work" program. In some examples, stages 210 and 215 can be carried out in conjunction with an enrollment process. For example, the management server 120 can require each user device 110 to provide certain credentials, including a username, password, token, and any other information necessary to securely enroll the user device 110 with the management server 120. As part of the enrollment process, the management server 120 can send a management agent 132 to a user device 110, and the management agent 132 can enforce compliance rules 124, management policies 125, and driving rules 129, as appropriate.

At stage 220 the first user device 110 collects first data, while at stage 225 the second user device 110 collects second data. The management agent 132 can specify which data to collect. These stages can occur independently, based on various factors such as user behavior, device status, and so on. For both stages 220 and 225, different types of data can be collected from the user devices 110. For example, the user device 110 can collect sensor 134 data as well as usage data.

Sensor 134 data can include data generated by processing information obtained from one or more sensors 134. For example, sensor 134 data can include raw or processed data obtained from one or more of a GPS sensor, accelerometer, proximity sensor, gravity sensor, gyroscope, magnetometer, ambient light sensor, microphone, camera, WIFI connector, BLUETOOTH connector, moisture sensor, press-sensitive screen, or any other sensors in the user device 110. The sensor 134 data can be collected by the management agents 132 of the first and second user devices 110 at stages 220 and 225, respectively.

In addition to sensor data, the management agents 132 can collect usage data, including any type of data generated based on a user's interaction with the user device 110. For example, usage data can include data associated with the coordinates of touch locations on a screen of the user device 110, the pressure of the user's touches on the screen of the user device 110, the duration of touches, and the timing associated with the user's touches. Usage data can also include data associated with gestures, such as tapping, scrolling, slinging, forced pressing, and zooming. Usage data can also include data associating any kind of touch data with what is shown on the GUI at that time. For example, usage data can include the time it takes for a user to respond to a question or prompt displayed on the GUI, as discussed with respect to FIG. 3. As another example, usage data can include a calculated calibrated orientation of the user device 110. The usage data from the first and second user devices 110 can be collected by the management agents 132 at stages 220 and 225, respectively.

At stages 230 and 235, the management agents 132 of the first and second user devices 110, respectively, transmit the collected first and second data to the management server 120. The management agents 132 can transmit the data over a wireless internet connection, such as an encrypted tunnel. In some examples, the data can be transmitted to an intermediate server that intercepts and packages the data before sending it to the management server 120. In another example, the data is transmitted to a standalone, machine-learning server that receives and processes data from the user devices 110. Although the flowchart of FIG. 2 shows the data being transmitted to the management server 120, it could alternatively be transmitted to a separate server that performs some or all of the functions of the management server 120.

At stage 240, the management server 120 can train custom models for the first and second user devices 110. Each model can be trained using data associated with a particular user or user device 110, such that the resulting models are customized for each user and/or user device 110. In one example, the models are trained for each user, such that a user can log into a different user device 110 while still utilizing the model that has been trained specifically for that user. In other examples, the models are trained relative to both the user and user device 110, such that different models can be generated for a single user using different devices 110. This can be useful where, for example, a user tends to use devices 110 in different ways, perhaps using one device more often while driving.

The models trained at stage 240 can be configured to use raw data, processed features, or a combination of both as the inputs to the models. In some examples, the models include sub-models for processing features from the raw data. In that case, the management agent 132 of a device can process features and feed the resulting processed features into the driving detection model. This can reduce the computational load on a user device 110 when attempting to detect driving.

The models trained at stage 240 can be based on any type of data collected from the user devices 110. A model can be trained based on sensor data alone, user-interaction data alone, or a combination of both types of data. Multiple examples are provided below.

In a first example, a model is trained based on sensor data alone. Sensor data from the GPS sensor and accelerometer, for example, can be used to determine driving events. For example, these sensors can be used to determine whether the user is on a local road or highway, whether the user traveling at a speed beyond the speed limit of that road, and whether the user is applying the brakes to slow the car down or applying the throttle to accelerate. Based on this data, the system can determine whether the user is driving. For example, User 1 might be twice as likely as User 2 to exceed the speed limit on the highway, while User 2 might use their brakes twice as often as User 1 on the highway. When the system determines, based on GPS data or accelerometer data, or both, that User 1 and User 2 are travelling in the same vehicle, the system can compare the driving characteristics to known trends for those two users. If the trends match one user over the other, a determination can be made regarding which user is driving. Even if the determination is not conclusive, the information gained from this type of comparison can be combined with other factors, described below.

In another example, the system can consider braking severity and acceleration severity based on sensor data. For example, sensor data from the GPS sensor, accelerometer, and gyroscope can be combined to learn a user's driving habits and establish baseline trends to which future driving events can be compared. Continuing the example, the sensor data can be used to calculated an average acceleration and deceleration for individual users. Some users may accelerate slowly to conserve fuel and brake early to recharge a battery in the car, while other users may accelerate quickly or brake later and harder. When the GPS determines that a user is in a vehicle based on the user's location and speed, the system can compare acceleration and deceleration information to determine if the user is driving. If the GPS determines that a user is in a vehicle but the acceleration and deceleration data do not match the trend for that user, that can indicate that the user is a passenger in the car.

In another example, the system can determine that a user is driving based only on orientation data. Orientation data can be considered either sensor data or usage data, but in either case can refer to the orientation of the user device 110 in three-dimensional space. A calibrated orientation position can be calculated using the accelerometer and gyroscope. The calibrated orientation can determine the device's orientation in three dimensions, and can be used to track the movement of the device in any direction. For example, a user might typically hold their device in their hand while operating the steering wheel, causing the device to experience continued left-right or up-down movements, or both, which can be detected by the system. In another example, the user might put their device in a particular location, and at a particular orientation, in their vehicle while they drive. Similarly, that user can have a tendency to hold the device in one orientation when reading and another when typing. In some examples, these patterns can be used to compare a user's behavior to their typical driving behavior based solely on orientation data.

In other examples, orientation data can be combined with user-interaction data to determine that a user is driving. In one example, the system can consider the orientation of the user device 110 while the user is typing slowly or in a disjointed manner. In this example, the trends established or utilized by a prediction model might indicate that a particular user types 30% slower while driving than while riding as a passenger. Those trends can also indicate that the same user is five times more likely to take pauses of one second or more while typing as a driver than as a passenger. The model can be trained to account for these trends. In that example, the management agent 132 can match device data to a trend using that model. In another example, information associated with trends, such as equations describing those trends, can be stored at the management server 120. The management server 120 can compare the data from those trends to incoming data from a device.

In another example, sensor data and user-interaction data can be combined to determine that a user is driving. In one example, the system can train a prediction model that accounts for the speed of the vehicle, based on GPS data, along with the typing speed of the user. In this example, the management server 120 can recognize trends indicating that when a user drives more than five miles-per-hour over the speed limit and attempts to type on their device, their typing accuracy drops by 40%. These trends can help the management server 120 or management agent 132 determine whether the user is driving by comparing the trends to current device data.

In another example, the system can train a prediction model that accounts for the braking behavior of the vehicle—based on GPS data or accelerometer data, or both—and the pressure and duration of user's touches on the screen of the device. The management server 120 can calculate trends indicating that when a user is applying the brakes of a vehicle while attempting to type, the user exhibits higher-than-normal forces and durations for touches. These trends can allow the management server 120 or management agent 132 to determine whether the user is driving by comparing the trends to current device data.

In other examples, trends can be determined based on any other sensor data or user-interaction data that is available. This can include, for example, gestures—such as a user that tends to scroll up more often while driving, in order to enable pressing the lower portion of the screen—time spent on an application, idle time while using an application, delay in responding to a prompt, using one-hand-typing features of a device—such as APPLE's double home-button tap, which can aid a user's typing while driving—and any other sensor data or user-interaction data. The various types of data can be combined with one another in any combination and with varying weights, and correlations between the data can be determined by a machine-learning process. Because of the machine-learning aspect of the system, there is no need for an administrator to manually predict trends or weights. Instead, the machine-learning processes determine trends and refines the model over time by confirming correct predictions and modifying the model based on incorrect predictions. At stages 250 and 255, the management server 120 can transmit the first and second custom models to the first and second user devices 110, respectively. In particular, the management server 120 can transmit the models to the management agent 132 of each user device 110, with instructions for the management agents 132 to utilize the models for detecting when a user is driving. The management agents 132 can implement the models and begin the process for detecting when each user is driving.

At stages 260 and 265, the management agents 132 of the first and second user device 110 utilize the first and second custom models, respectively, to detect when the user of each user device 110 is driving. Detecting driving can include, for example, feeding raw sensor 134 data or usage data, or both, into the custom model trained by the management server 120. In some examples, detecting driving can include a first step of processing features and feeding those processed features into the custom model trained by the management server 120. In some examples a combination of raw data and processed features are provided as inputs to the custom model.

If the first user device 110 detects driving at stage 260, it can enforce a driving policy 129 at stage 270. Similarly, if the second user device 110 detects driving at stage 265, it can enforce a driving policy 129 at stage 275. Enforcing a driving policy 129 can encompass any enforcement mechanisms or other actions carried out by a management agent 132 in response to detecting driving. For example, the management agent 132 can prevent an application 112 from executing on a user device 110, lock the device 110, restrict access to a keyboard on the GUI of the device 110, or modify notifications generated by applications 112 on the device 110.

The driving policies 129 enforced on the first and second user devices 110 can be different from one another. For example, the driving policies 129 can be determined based on the organizational group 123 or management policy 125 associated with each user. The driving policy 129 can be stored locally on the user device 110 and received at some prior time from the management server 120. The management agent 132 can limit the functionality of various applications as specified by the driving policy 129.

Although not shown in FIG. 2, additional stages can include collecting additional data, including data confirming that the user is or is not driving a vehicle, and providing the additional data to the management server 120. The management server 120 can utilize the additional data to modify the custom model for that user device 110, adapting the model over time as more data is collected. In this way, the management server 120 can not only perfect the model for a given scenario, but adapt to changes in user behavior over time. For example, if a user injures his or her hand, the user's habits of using the device 110 might change for a period of time while the injury recovers. By receiving feedback in the form of additional data, the management server 120 can adapt the custom models to reflect the user's new habits.

Figure 3:
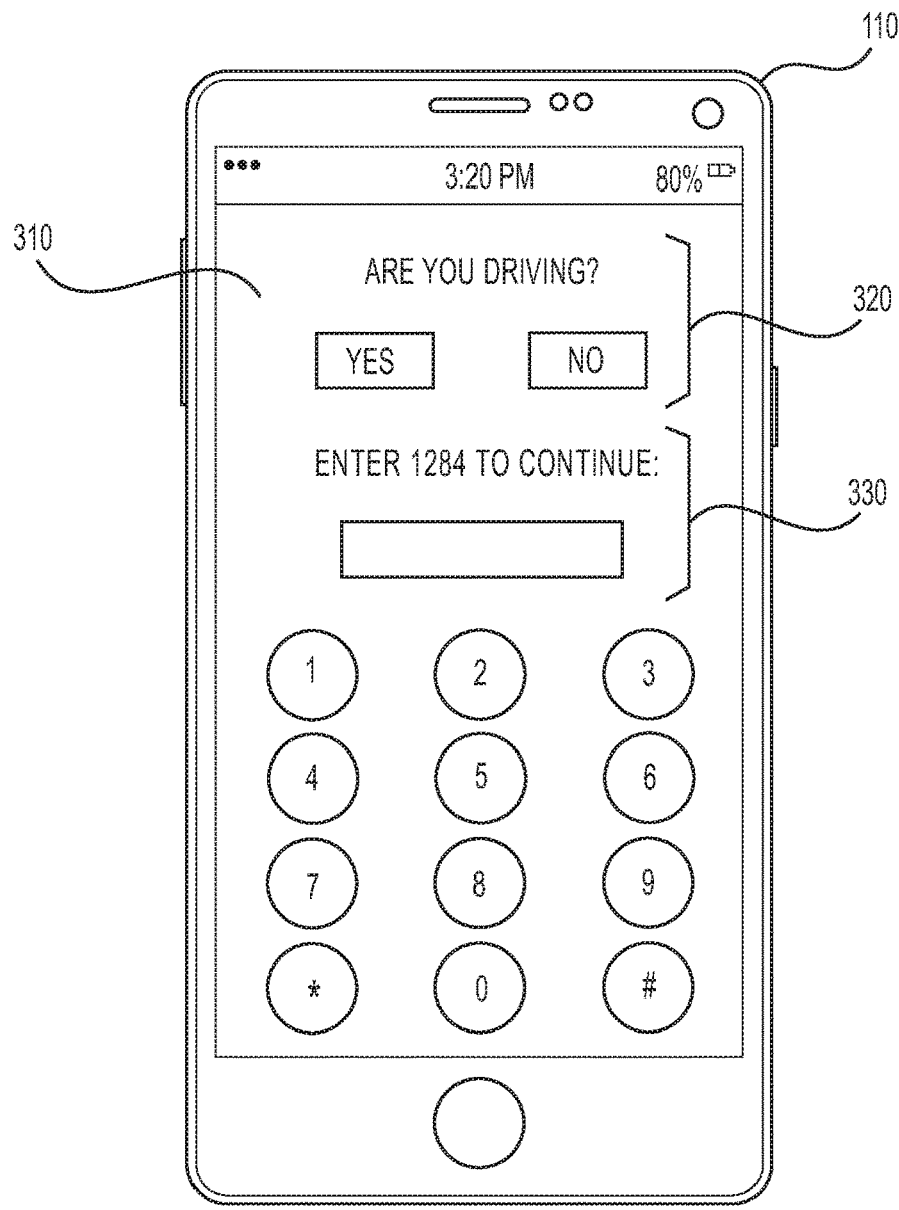
FIG. 3 is an exemplary illustration of a GUI for receiving a user's interaction and determining whether the user is driving.

FIG. 3 provides an illustration of an example user device 110 displaying a GUI 310 for gathering usage data from a user. As explained above, usage data can include data associated with the manner in which a user interacts with a user device 110. This can include, for example, the coordinates of touch locations, touch pressure, touch duration, touch timing, and gestures. The example GUI 310 depicted in FIG. 3 provides several mechanisms for gathering usage data from a user.

Element 320 of FIG. 3 includes a prompt asking the user whether they are driving or not, and providing buttons for the user to select in answering the question. If the user answers "yes," then the management agent 132 of the user device 110 can skip further detection mechanisms and simply enforce the driving policy immediately. In some examples, a "yes" answer is merely used as feedback to refine the custom detection model for that user.

In another example, element 320 asks the user if they were previously driving, such as "Did you begin driving at around 3:02 PM today?" This can allow for prompting the user after the management agent 132 has detected the user is no longer driving or is parked. The management agent 132 can store the date and time that driving was detected, and use that date and time information in the verification process.

Regardless of whether the user selects "yes" or "no" at element 320, usage data can still be collected regarding the manner in which the user selects their answer. For example, usage data can be collected regarding the amount of time the user takes to answer the question, the precision of the touch, or the particular finger used to touch. In an example, a camera of the user device 110 can determine whether the user is looking at the screen when the question is posed and whether the user looks away from the screen before answering. The camera can also be used to capture images that can be evaluated to identify whether the user is in a vehicle and driving. In one example, images can be captured when data suggests that the user is driving.

Element 330 of FIG. 3 is an additional element that can be implemented to gather usage data from a user. Element 330 can be used in conjunction with element 320—for example, if the user answers "no" to the question at element 320 but other indicators point toward the user actually driving, then the user can be prompted with element 330. In the example of FIG. 3, element 330 is a request for the user to input a particular string of characters. A keypad is displayed on the GUI 310 to allow the user to input those characters. The management agent 132 can track usage data relating to the manner in which the user responds to the prompt in element 330.

For example, the management agent 132 can track the amount of time it takes to type the characters, the accuracy of the typing, the time elapsed between each character, and any other information generated during the response. Generally speaking, a driver will use one hand to hold and operate a user device 110. As a result, the user's touches can be slower than when using two hands. Additionally, the user can pause to look at the road while typing, which does not happen as frequently when typing as a passenger. While driving, the user's touch locations can be more prevalent and more accurate in a lower region of the user device 110, closer to the user's thumb, relative to touches toward the top of the screen. Touches toward the top of the screen of the user device 110 can be less accurate and can take more time than normal as the user adjusts his or her hand to reach the far corners of the screen. If the user device 110 includes a fingerprint sensor in the screen, the management agent 132 can track which finger or fingers are used to type on the user device 110, and use that information to help determine whether the user is holding the device 110 with one hand or two. Similarly, the management agent 132 can calculate a calibrated orientation of the phone and compare that orientation to previous orientations where the user either confirmed or denied driving a vehicle.

While FIG. 3 depicts a GUI 310 dedicated to gathering usage data for the purpose of detecting driving, similar features can be imbedded into applications 112 or into the operating system of the user device 110. For example, using a software development kit (SDK) or application wrapping, an application 112 can be injected with features that collect relevant usage data. For example, an email application 112 can be injected with a function that, when the user may be driving, prompts the user with a question regarding whether they would like to save a draft of their email for later use. The application 112 can then gather usage data based on the user's response to that prompt. A prompt is not necessary, however, as an application 112 can gather information based on any user interaction with an application 112, such as typing. For example, an email or messaging application 112 can gather usage data simply from the user's interaction with a soft keyboard on a GUI 310, and the management agent 132 can use that data to determine whether the user is driving.

Figure 4:
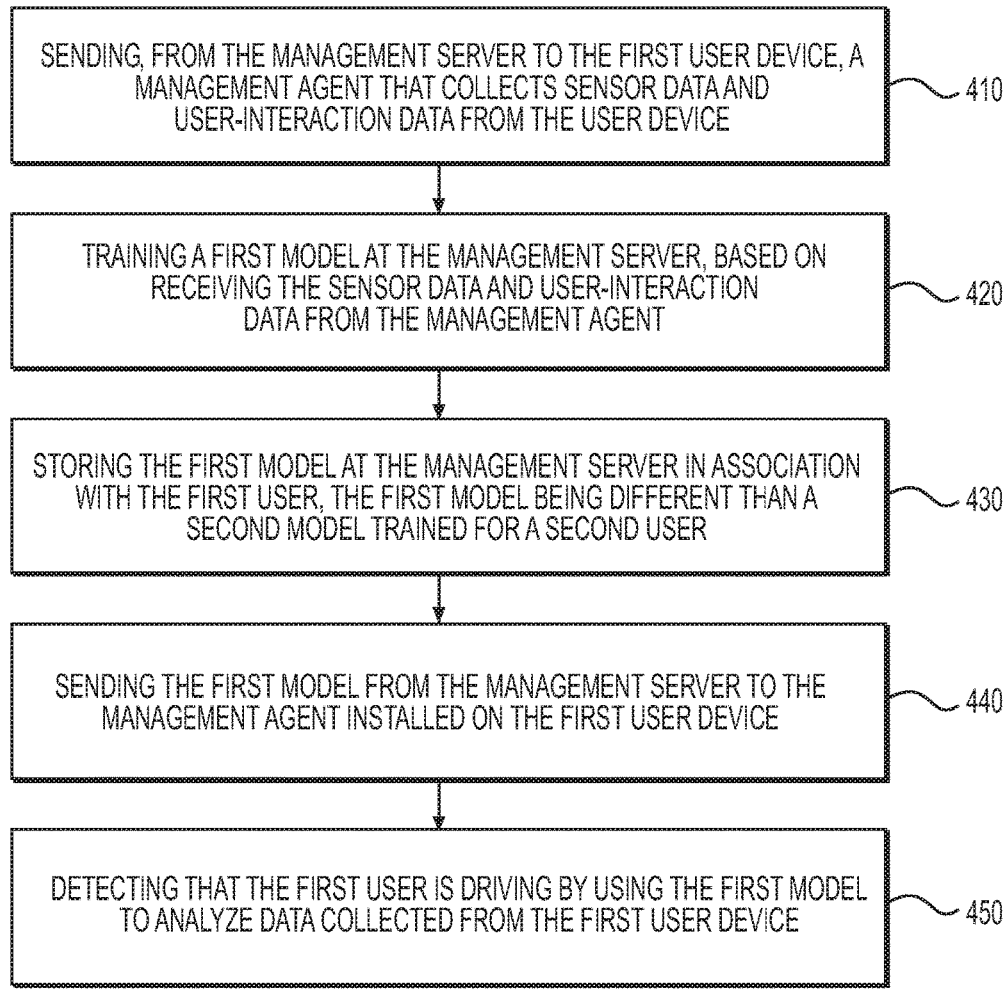
FIG. 4 is a flowchart of an exemplary method for providing and enforcing custom models for detecting driving.

FIG. 4 provides a flowchart of an example method for providing custom models to user devices 110 for detecting when a user is driving. Stage 410 includes sending, from the management server 120 to the first user device 110, a management agent 132 that collects sensor data and user-interaction data from the user device 110. Stage 410 can be carried out in conjunction with an enrollment process. For example, the management server 120 can require each user device 110 to provide certain credentials, including a username, password, token, and any other information necessary to securely enroll the user device 110 with the management server 120. As part of the enrollment process, the management server 120 can send a management agent 132 to a user device 110, and the management agent 132 can enforce compliance rules 124, management policies 125, and driving rules 129, as appropriate.

Stage 420 includes training a first model at the management server 120 based on receiving the sensor data and user-interaction data from the management agent 132 of the relevant user device 110. For example, the management agent 132 can transmit raw data collected from the GPS sensor, accelerometer, gyroscope, and any other relevant sensors 134 to the management server 120. The management agent 132 can also send data associated with the user's interaction with the user device 110, such as the coordinates of the user's touch locations, the user's touch pressure, duration of the user's touches, gestures, and any other interactions. The management server 120 can use this data to train a model for the user of the first user device 110.

Stage 430 includes storing the first model at the management server 120 in association with the first user, the first model being different than a second model trained for a second user. As explained previously, each model can be trained with information specific to a particular user and/or user device 110. Therefore, each model can be different from one user to another, and can even be different across multiple user devices 110 belonging to the same user. The management server 120 stores the model in association with a particular user and user device 110, such that it can modify and update the model in the future.

Stage 440 includes sending the first model from the management server 120 to the management agent 132 installed on the first user device 110. The management server 120 can transmit the model along with instructions for the management agent 132 to utilize the model for detecting when a user is driving. Stage 440 may also include sending sub-models for processing features to be used as inputs to the overall detection model. For example, a sub-model can include equations for analyzing GPS data to determine whether the user is in a vehicle, the vehicle's speed, and various processed features such as turning, accelerating, braking, and so on.

Stage 450 includes detecting that the first user is driving by using the first model to analyze data collected from the user device 110. This stage can be carried out by the management agent 132 installed on the user device 110, for example by inputting raw data or processed features into the model provided by the management server 120. In another example, this stage is carried out by the management server 120 after having received data from the user device 110.

Figure 5:
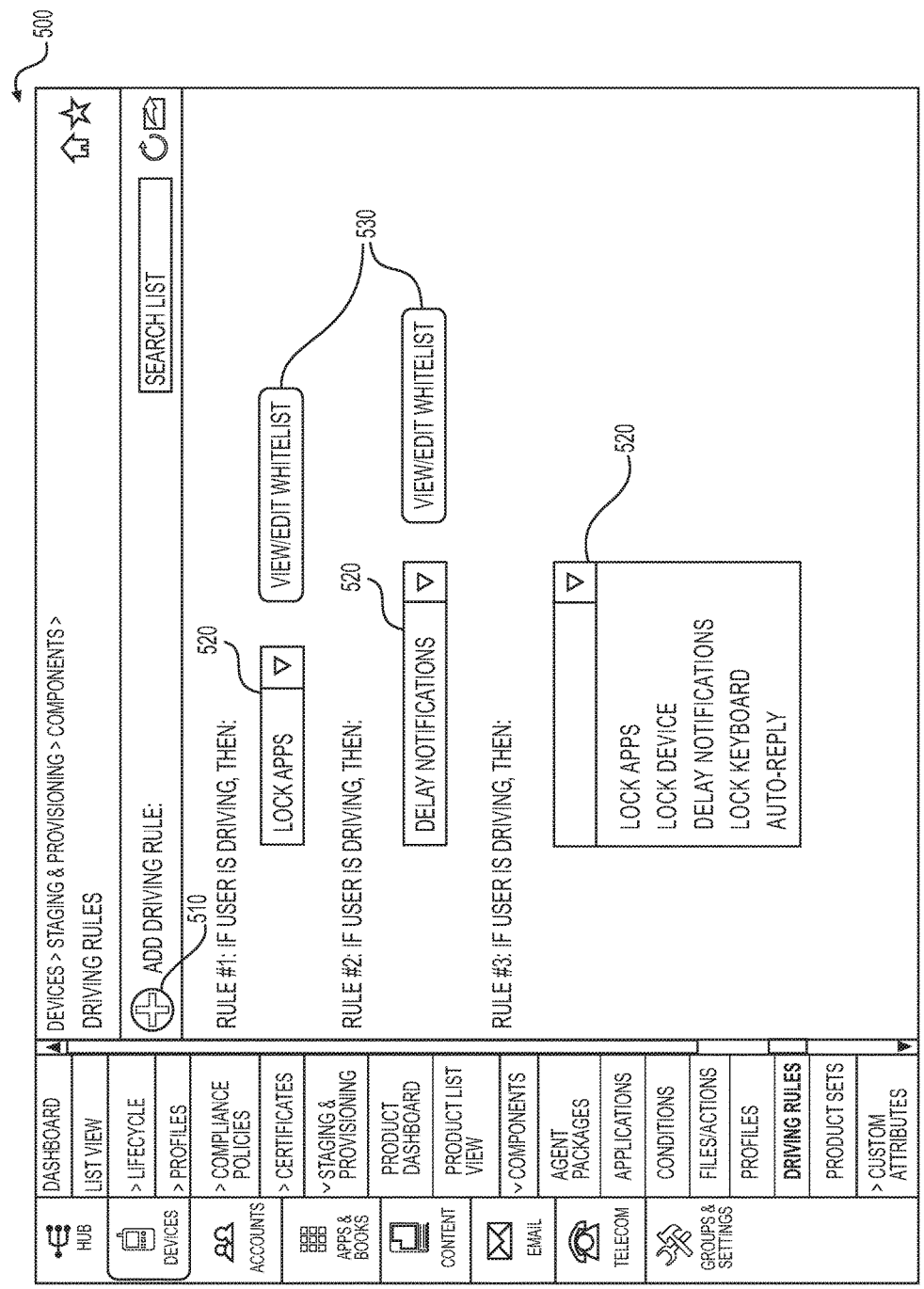
FIG. 5 is an exemplary illustration of a GUI for creating driving rules to be enforced at a user device.

FIG. 5 provides an illustration of an example GUI 500 for creating, deleting, or modifying driving rules to be enforced at a user device 110. The GUI 500 of FIG. 5 can be a page of an administrator console made available to individuals with administrative access. The administrator console can be used to manage various aspects of an EMM system, but in this example the console is displaying the "Driving Rules" submenu. The administrator console can be used to set the driving rules 129 and management policies 125 at the management server 120 for users. The driving rules 129 can be set for individual users or organizational groups 123.

Within the Driving Rules submenu, a button 510 is provided for adding a new driving rule. Although three driving rules are shown, there is no limit to the number of driving rules that can be created. Each driving rule can include an action selection from an action menu 520, as well as an options button 530. Example actions include: locking applications, locking the device, delaying notifications, locking the keyboard, and turning on an auto-reply function.

The first driving rule specifies that if a user is driving, the management agent 132 of the user device 110 is to lock, or restrict, the applications 112 on the user device 110. The options button 530 provides a mechanism to view or edit a whitelist. The whitelist can allow particular applications 112 to continue executing on the device 110 even during driving. The whitelist can be used to allow important applications 112 to execute normally, such as navigation applications 112, map applications 112, and a phone application 112. The administrator can determine which applications 112 should be allowed to execute while the user is driving.

The second driving rule specifies that if a user is driving, the management agent 132 of the user device 110 delays notifications generated by applications 112 on the user device 110. Again, an option button 530 provides a mechanism for establishing exceptions to this rule. For example, a whitelist can allow notifications to issue normally for any applications 112 placed on the whitelist. This can be used to allow important applications 112 to issue notifications to the user. For example, a navigation application 112 can be placed on the whitelist such that the user receives any important notifications related to their travel.

The third driving rule shown in FIG. 5 has not been configured yet, and the drop-down action menu 520 shows a number of potential actions. These are merely exemplary, and additional actions can be included in other embodiments. Based on the selected action, an options button 530 can be displayed on the GUI 500. For example, the "lock keyboard" action can include a whitelist similar to the whitelists discussed above, and can include an option for allowing voice-to-text for applications 112 where the keyboard is otherwise restricted. As another example, the "auto-reply" action can include associated options regarding the content of the automatically generated reply, the applications 112 in which the auto-reply is to be applied, and whether the auto-reply quotes an estimated time when the user is expected to stop driving. These examples are not intended to be limiting, and additional options can be included and accessed by the options button 530.

Figure 6:
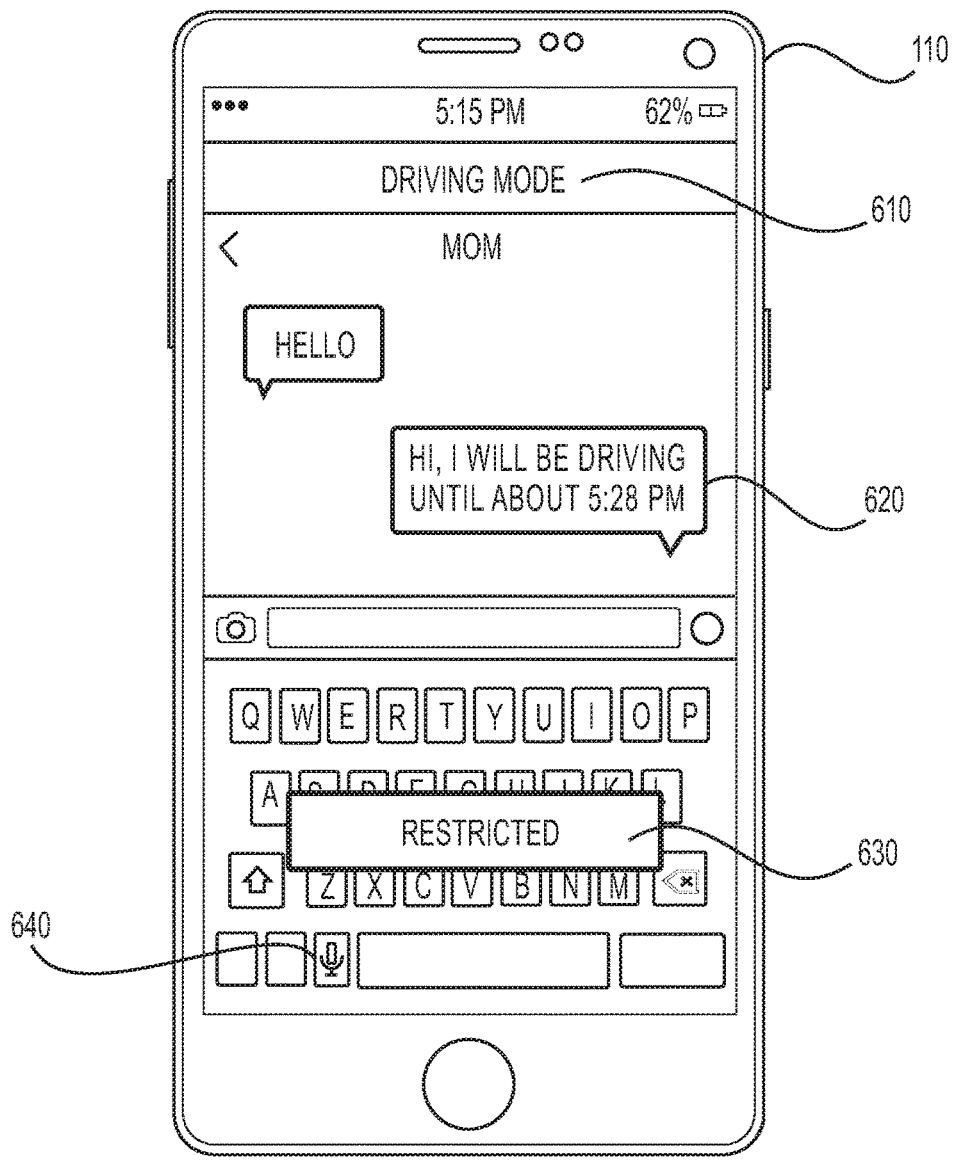
FIG. 6 is an exemplary illustration of a user device GUI enforcing a driving rule that restricts access to the user device.

FIG. 6 provides an illustration of an example user device 110 enforcing a driving mode that includes several driving rules. A banner 610 indicates that the user device 110 is enforcing a driving mode. In some examples, the banner 610 can be displayed any time the user device 110 is enforcing a driving rule, such as one of the driving rules configured at the administrator console depicted in FIG. 5. The banner 610 indicates to the user that their device 110 is enforcing at least one driving rule at that moment. Although shown as a banner 610, other types of displays can be used as well. For example, the GUI of the user device 110 can include a small icon, rather than a banner, similarly indicating that the user device 110 is enforcing a driving rule.

FIG. 6 also depicts an automated reply 620 sent as a result of a driving rule. For example, a relevant driving rule may specify that while the user is driving, all incoming text messages are sent an automatic response indicating that the user is still driving. In this example, the user receives a message from a contact while the user is driving, and the management agent 132 of the user device 110 enforces a driving rule that specifies an automatic response to incoming messages. Also in this example, the automated reply 620 specifies an estimated time until which the user is expected to be driving. This feature can function automatically, for example by retrieving information from a navigation application 112 to determine an estimated time of arrival for the user. While the example of FIG. 6 depicts an automated reply 620 to a text message, similar functionality can be applied to any other type of incoming communication. For example, an incoming email can generate a response indicating that the user is driving. Similarly, an incoming phone call can cause the user device 110 to send the call to voice mail, where the voice mail message indicates that the user is driving. In that example, the user device 110 can also send a text-based communication, such as a text message, to the caller to indicate that the user is driving.

In addition to the automated reply functionality, FIG. 6 depicts another driving rule that modifies access to the soft keyboard of the GUI. As shown, the GUI can display a restricted message 630 across the keyboard to indicate to the user that the keyboard is not currently functional. In another example, the keyboard is grayed out to indicate that it is not functional. In some examples, the microphone button 640 can remain functional, such that the user can access a voice-to-text feature. For example, the user could select the microphone button 640, speak their communication verbally, and have the messaging application transcribe the communication to text and send it to the user's contact. In some examples, the restriction message 630 can include an option for the user to override the keyboard restriction. This feature may be useful in the case of an emergency, for example. In another example, an option for overriding the keyboard restriction can lead to a prompt, such as the GUI prompt shown in FIG. 3, to provide the user with an opportunity to indicate that they are not actually driving.

Figure 7:
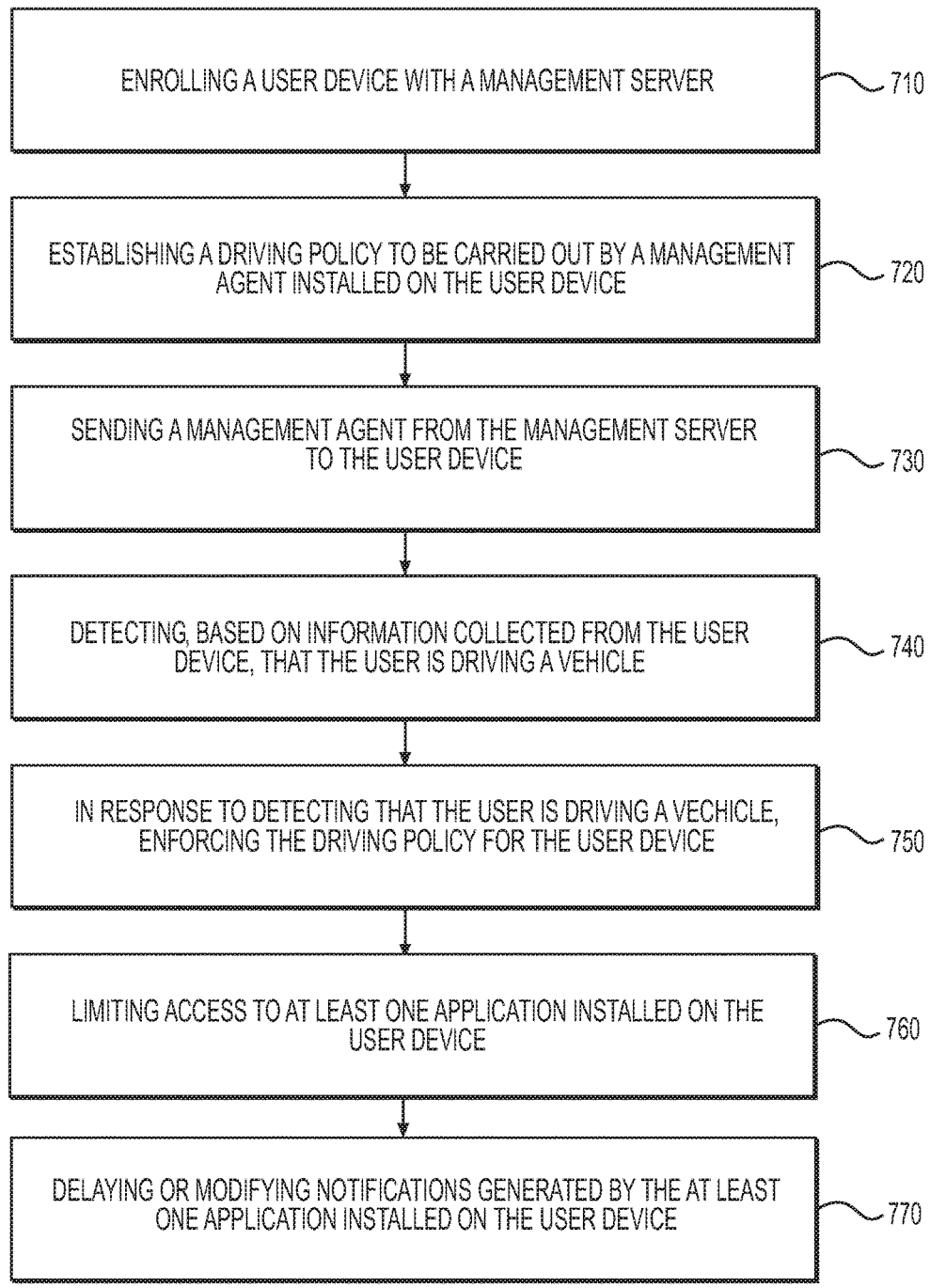
FIG. 7 is a flowchart of an exemplary method for enforcing a driving mode on a user device.

FIG. 7 provides a flowchart of an example method for enforcing a driving rule, or "driving policy," on a user device 110. Stage 710 can include enrolling the user device 110 with a management server 120. The enrollment process can utilize an enrollment component 121 and administrator component 122, as described with reference to FIG. 1, to enroll the user device 110.

Stage 720 can include establishing a driving policy to be carried out by a management agent 132 installed on the user device 110. Establishing a driving policy can include, for example, creating a driving rule using an administrator console such as the one depicted in FIG. 5. An administrator can utilize a console or other input mechanism tied to the management server 120 to create one or more rules that specify actions for a management agent 132 to carry out in response to detecting driving.

Stage 730 includes sending a management agent 132 from the management server 120 to the relevant user device 110. In some examples, stage 730 is carried out as part of the enrollment process described with respect to stage 710. The management agent 132 can enforce compliance rules 124, management policies 125, and driving rules 129, as appropriate, on the user device 110. The management agent 132 can also collect and transmit driving data to the management server 120 as described in earlier embodiments.

Stage 740 includes detecting, based on information collected from the user device 110, that the user is driving a vehicle. This stage can include collecting information and sending it to the management server 120 for the purposes of training a driving-detection model. Similarly, this stage can include receiving a custom model from the management server 120 to be utilized by the management agent 132 in detecting driving. Once the management agent 132 has received the custom model, it can collect data from the user device 110, such as sensor 134 data and usage data, and feed that data into the custom model.

At stage 750, in response to detecting that the user is driving a vehicle, the management agent 132 can enforce one or more driving rules for the user device 110. For example, the management agent 132 can take various actions, including locking applications, locking the device, delaying notifications, locking the keyboard, and turning on an auto-reply function. These functions are discussed in greater detail with respect to FIGS. 5 and 6, above.

Stages 760 and 770 include specific enforcement steps that can be carried out by the management agent 132 as a result of detecting that the user is driving a vehicle. At stage 760, for example, the management agent 132 can limit access to at least one application installed on the user device. Limiting access can include preventing the application from executing on the user device 110, blocking certain functions within the application, or restricting access to a soft keyboard while accessing the application, as examples. Limiting access can also include locking the user device 110 during the duration of time that the user is driving.

Stage 770 can include delaying or modifying notifications generated by the at least one application installed on the user device 110. For example, the management agent 132 can modify the priority level of the notification set by the application 112, by downgrading the priority level if the application 112 is not conducive to driving, or upgrading the priority level of a driving-related application 112 such as a navigation application 112. In some examples, the management agent 132 can prevent or delay the notification object from being passed to the notification center while the user is driving.

An example workflow having various stages is also disclosed herein. A first stage can include a training mode. The training mode can include collecting data from a management agent 132 of a user device 110 and obtaining a model. A second stage can include vehicle mode detection, the purpose of which can be to determine whether the user is in a vehicle. To make this determination, the management agent 132 of a user device 110 can access data from the GPS sensor to determine whether the car is traveling at more than a predetermined speed, such as five miles per hour. If the user device 110 is traveling at more than five miles per hour, a safe-driving mode can initiate. If the user device 110 is traveling less than five miles per hour, the management agent 132 can stop and then check again after a minute has passed.

If the user device is traveling at more than five miles per hour and safe-driving mode is initialized, the next stage of the workflow can be a driver-or-passenger determination. In this stage, the management agent 132 collects sensor data and user-interaction data from the user device. The management agent 132 can process the data itself, preprocess the data and send it to the management server 120, or simply send all of the collected data to the management server 120. The management agent 132 or management server 120 can use the machine-learning-generated model to make a prediction as to whether the user is a driver or passenger in the vehicle.

If the user is predicted to be driving the vehicle, then the enforcement stage can be initiated. The enforcement stage can prompt the user for a password when the user attempts to access an application, such as a managed application wrapped with a safe-driving feature. In one example, the user can be prompted for a password. In another example, the user can be prompted to answer a question as to whether the user is driving or not. The management agent 132 of the user device 110 can collect information related to the user's response. In addition to accounting for the response itself, the management agent 132 can collect user-interaction data, such as the amount of time the user takes to respond to the prompt, the user's touch pressure or touch accuracy, and so on. The management agent 132 can then make a determination of whether the user is a driver or passenger. If the user is determined to be a driver, then the user's access to the desired application can be restricted. If the user is determined to be a passenger, the user can retain full access to the application. In either case, the system can use the additional data collected during the enforcement phase to update its prediction.

A data transfer stage can follow the enforcement stage. In the data transfer stage, the management agent 132 can first check if the vehicle is stopped, using GPS data for example. If the car is stopped, the management agent 132 can then await a wireless internet connection. When the connection is obtained, the management agent 132 can upload data to the management server 120, including data regarding each stage of the example workflow. The management server 120 can use that data to update the model, and send the updated model to the user device 110.

In another example, the system can utilize an adaptive enforcement approach. For example, if the user is driving and is approaching a high-risk area, such as an area that experiences frequent vehicle accidents or that has pedestrian traffic, the safe-driving mode can adaptively enforce restrictions. For example, the user device 110 can be locked, an opened application can be closed, or a warning can be displayed to the user. In some examples, an area can be designated as a pedestrian area based on information at the management server 120. For example, the management server 120 can access location information for any user devices 110 enrolled with the management server 120 to determine a concentration of pedestrians.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

Although described in the context of an EMM system, the techniques for detecting and enforcing driving restrictions do not require an EMM system. The driver-detection algorithms can also be evaluated and enforced locally on the user device 110 by an application or by an operating system of the user device.

What is claimed is:

1. A method for detecting driving based on user-specific models for driving detection, comprising:
    sending a management agent from a management server to a first user device for installation, wherein the management agent collects first sensor data from the first user device while a first user is logged into the first user device, and wherein the management agent collects first user-interaction data from the first user device based, at least in part, on the first user's interaction with a graphical user interface (GUI) of the first user device;
    training a first model at the management server based on receiving the first sensor data and first user-interaction data from the management agent, wherein training comprises modifying the first model based on whether the first model correctly predicts that the first user is driving;
    storing the first model at the management server in association with the first user, the first model being different than a second model trained for a second user; and
    sending the first model from the management server to the management agent installed on the first user device, for use when the first user is logged in, wherein the management agent detects that the first user is driving by using the first model to analyze data collected from the first user device.

2. The method of claim 1, wherein the management agent determines a processed feature and provides information associated with the processed feature as an input to the first model.

3. The method of claim 1, wherein the management agent determines a calibrated orientation of the first user device, based on data received from an accelerometer and gyroscope of the first user device, and sends information associated with the calibrated orientation to the management server.

4. The method of claim 1, wherein determining whether the first model correctly predicts that the first user is driving comprises prompting the first user with a GUI element that requires the first user's interaction.

5. The method of claim 1, wherein the first model trained by the management server distinguishes between when the first user is driving and when the first user is a passenger in a moving vehicle.

6. The method of claim 1, wherein the management agent modifies the first model based on whether the first model correctly predicts that the first user is driving.

7. The method of claim 1, further comprising enforcing, by the management agent, a driving mode at the first user device based on detecting driving.

8. A non-transitory, computer-readable medium containing instructions that, when executed by a processor of a management server, performs stages for detecting driving at a user device based on user-specific models for driving detection, the stages comprising:
  sending a management agent from the management server to a first user device for installation, wherein the management agent collects first sensor data from the first user device while a first user is logged into the first user device, and wherein the management agent collects first user-interaction data from the first user device based, at least in part, on the first user's interaction with a graphical user interface (GUI) of the first user device;
  training a first model at the management server based on receiving the first sensor data and first user-interaction data from the management agent, wherein training comprises modifying the first model based on whether the first model correctly predicts that the first user is driving;
  storing the first model at the management server in association with the first user, the first model being different than a second model trained for a second user; and
  sending the first model from the management server to the management agent installed on the first user device, for use when the first user is logged in, wherein the management agent detects that the first user is driving by using the first model to analyze data collected from the first user device.

9. The non-transitory, computer-readable medium of claim 8, wherein the management agent determines a processed feature and provides information associated with the processed feature as an input to the first model.

10. The non-transitory, computer-readable medium of claim 8, wherein the management agent determines a calibrated orientation of the first user device, based on data received from an accelerometer and gyroscope of the first user device, and sends information associated with the calibrated orientation to the management server.

11. The non-transitory, computer-readable medium of claim 8, wherein determining whether the first model correctly predicts that the first user is driving comprises prompting the first user with a GUI element that requires the first user's interaction.

12. The non-transitory, computer-readable medium of claim 8, wherein the first model trained by the management server distinguishes between when the first user is driving and when the first user is a passenger in a moving vehicle.

13. The non-transitory, computer-readable medium of claim 8, wherein the management agent modifies the first model based on whether the first model correctly predicts that the first user is driving.

14. The non-transitory, computer-readable medium of claim 8, wherein the management agent enforces a driving mode at the first user device based on detecting driving.

15. A system for detecting driving based on user-specific models for driving detection, comprising:
  a non-transitory, computer-readable medium that contains instructions;
  a management server comprising a processor that executes the instructions to perform stages including:
    sending a management agent from the management server to a first user device for installation, wherein the management agent collects first sensor data from the first user device while a first user is logged into the first user device, and wherein the management agent collects first user-interaction data from the first user device based, at least in part, on the first user's interaction with a graphical user interface (GUI) of the first user device;
    training a first model at the management server based on receiving the first sensor data and first user-interaction data from the management agent, wherein training comprises modifying the first model based on whether the first model correctly predicts that the first user is driving;
    storing the first model at the management server in association with the first user, the first model being different than a second model trained for a second user; and
    sending the first model from the management server to the management agent installed on the first user device, for use when the first user is logged in, wherein the management agent detects that the first user is driving by using the first model to analyze data collected from the first user device.

16. The system of claim 15, wherein the management agent determines a processed feature and provides information associated with the processed feature as an input to the first model.

17. The system of claim 15, wherein the management agent determines a calibrated orientation of the first user device, based on data received from an accelerometer and gyroscope of the first user device, and sends information associated with the calibrated orientation to the management server.

18. The system of claim 15, wherein determining whether the first model correctly predicts that the first user is driving comprises prompting the first user with a GUI element that requires the first user's interaction.

19. The system of claim 15, wherein the first model trained by the management server distinguishes between when the first user is driving and when the first user is a passenger in a moving vehicle.

20. The system of claim 15, wherein the management agent modifies the first model based on whether the first model correctly predicts that the first user is driving.

* * * * *